United States Patent [19]
Martin

[11] Patent Number: 5,732,910
[45] Date of Patent: Mar. 31, 1998

[54] COMPUTER SUPPORT APPARATUS

[76] Inventor: Mary L. Martin, 2737 N. Hampden Ct., Chicago, Ill. 60614

[21] Appl. No.: 537,444

[22] Filed: Oct. 2, 1995

[51] Int. Cl.$^6$ ............................................. B68G 5/00
[52] U.S. Cl. ............................ 248/118; 108/43; 248/918
[58] Field of Search ......................... 248/118, 118.1, 248/346.01, 633, 918; 108/43; 312/208.1, 286, 287

[56] References Cited

U.S. PATENT DOCUMENTS

| | | | |
|---|---|---|---|
| 2,171,772 | 9/1939 | Viehmann | 312/286 |
| 2,565,784 | 8/1951 | Sheean | 312/286 |
| 2,739,026 | 3/1956 | Moore | 312/286 X |
| 5,143,341 | 9/1992 | Juster | 248/444 |

*Primary Examiner*—Ramon O. Ramirez
*Assistant Examiner*—Willie Berry, Jr.
*Attorney, Agent, or Firm*—Howard Cohen

[57] ABSTRACT

An apparatus for supporting a computer keyboard or laptop computer on the lap of the user is generally comprised of a top member, medial member, and lower member assembled in vertically stacked relationship. The top member includes an upper surface for supporting a computer keyboard or laptop computer. A raised ledge adjacent to the upper surface includes a pair of resilient pads to engage the wrists of the user in supporting relationship. An interior cavity extends laterally below the upper support surface to receive a drawer which may be withdrawn slidably from either end of the cavity. The drawer is formed in bilateral sections, one supporting a mouse pad, the other storing floppy disks. A removable copy stand may be erected by engaging a pair of holes formed in each bilateral portion of the drawer. The lower member is provided with a wedge form tapering from the distal edge to the proximal edge, with a pair of shallow troughs formed in the bottom surface to accommodate the legs of the user. The bottom surface includes convex protrusions in a regular array to provide soft contact and high friction. A handle is formed integrally in the proximal surfaces of the upper and medial members. A foot protruding from the distal side of the assembly includes a base surface extending orthogonally to the upper support surface, and an optional stability plate may be secured to the base in ground-engaging fashion with the assembly extending upwardly therefrom. A desk clamp may be secured to the foot to hang the apparatus in cantilever fashion on the edge of a desk or table.

18 Claims, 6 Drawing Sheets

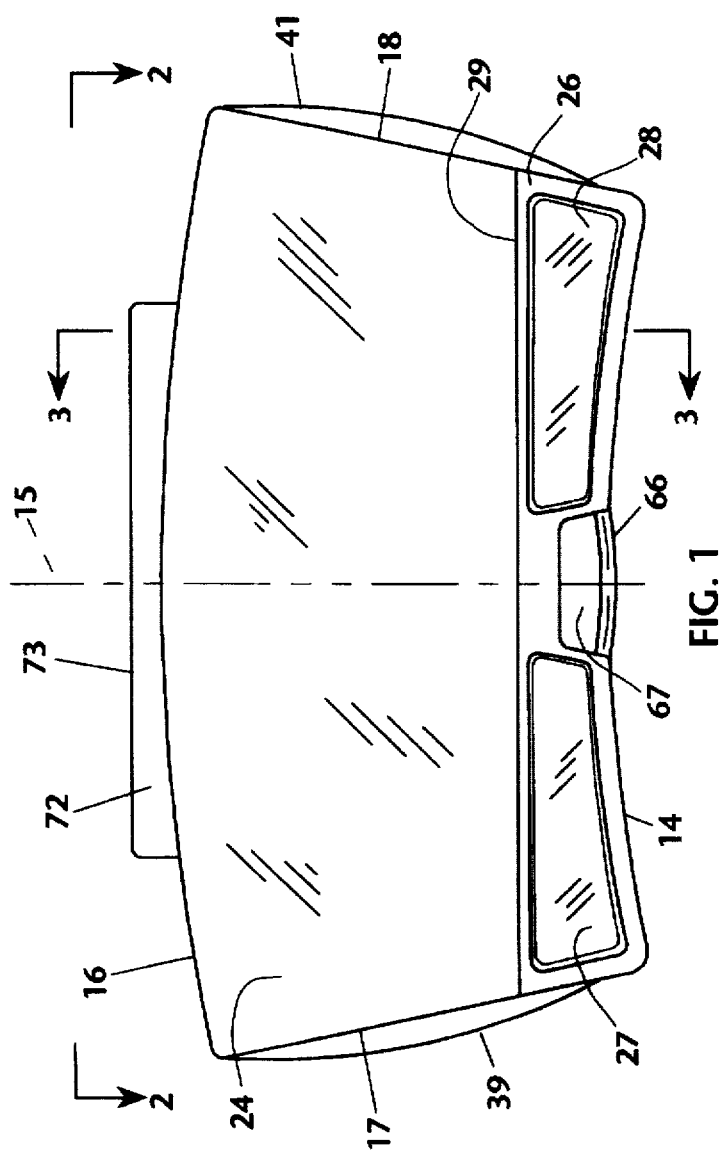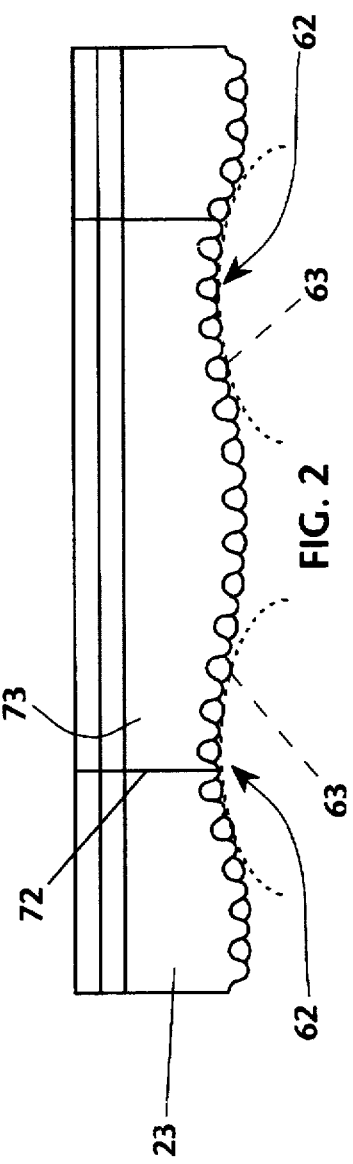

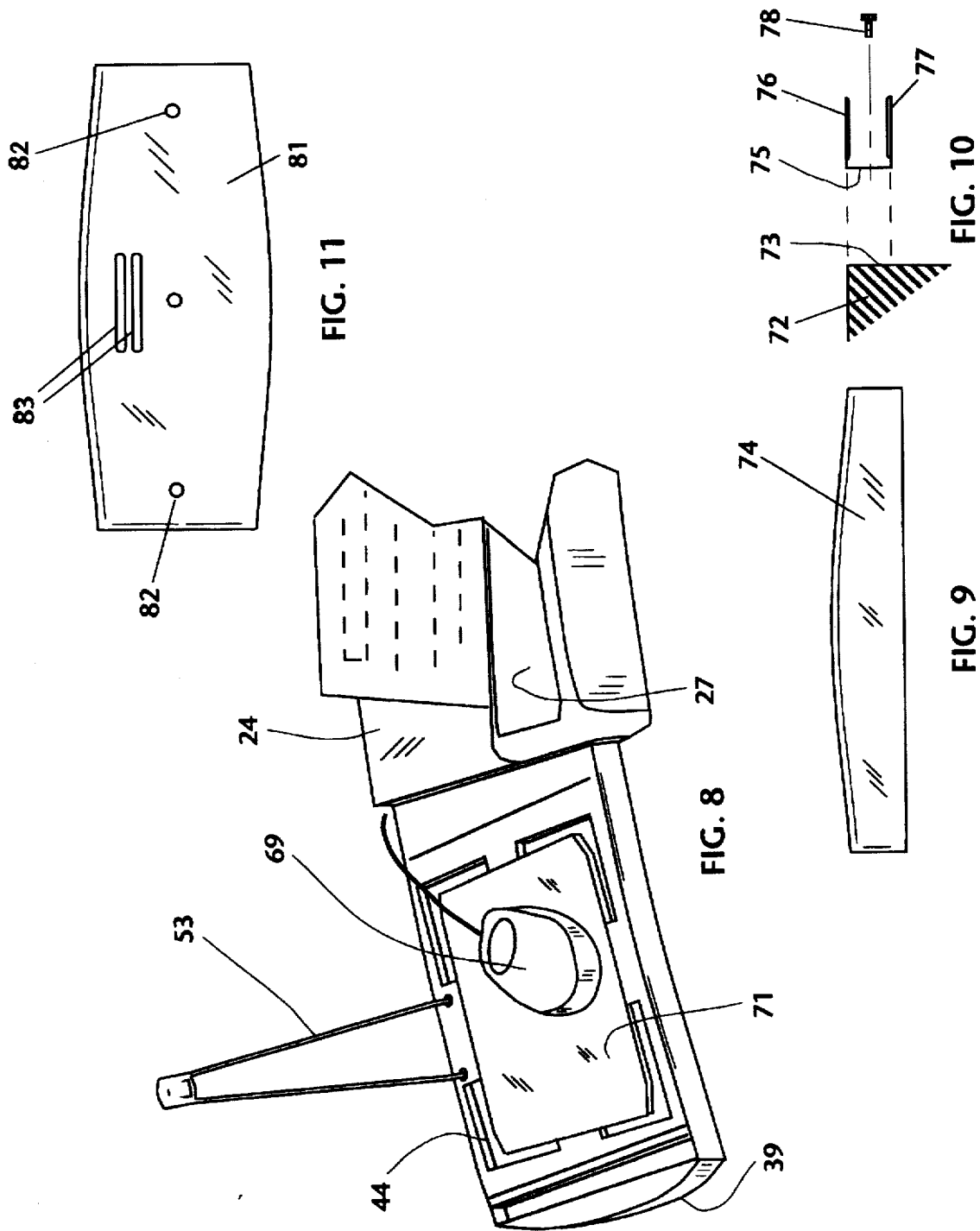

COMPUTER SUPPORT APPARATUS

BACKGROUND OF THE INVENTION

The present invention relates to computer support devices, and more particularly to devices for supporting keyboards, laptop computers, and associated ancillary computer input devices.

The proliferation of personal computers in recent years has profoundly altered the manner in which a great amount of office work is carried out. Whereas most office tasks formerly consisted of paperwork that involved manual reading, writing, and processing of documents, a large proportion of office work is now accomplished with a keyboard, and often a mouse or other input pointer, connected to a stand-alone computer under the exclusive control of an individual worker. Although the transition to computerized tasks has not resulted in the long-promised "paperless" society, it has greatly accelerated many tasks that involve writing, graphics, and data processing.

The advent of personal computers has also changed the landscape of a typical office. Video displays, alphanumeric keyboards, modems, scanners, CD ROMs, and the like now occupy many desks that were previously used for paperwork. Unfortunately, the typical office desk is often not designed for computer use. In particular, the height of a desk top surface is dimensioned for reading and writing, but is generally too high for keyboard use. Some modem desks provide a lower shelf for keyboard support at a more appropriate height. However, many computer users find that the most comfortable manner for using a keyboard is to place the keyboard on the lap, so that the arms and hands need not be raised continually to access a keyboard supported on the higher surface of a desk. In this regard, it is noted that the typical desk return, which is dimensioned to support an electric typewriter, is generally too low to support comfortably a modem computer keyboard.

Moreover, the typical office desk (or desk return) lacks the depth (front edge to back edge) both to support a computer and all the peripheral devices noted above, while also providing sufficient space to establish a comfortable work area. The keyboard area is often too shallow, and the computer user is typically required to sit closer to the monitor than is desireable or optimal.

In accord with the laptop style of computer use, the laptop computer has evolved. Such computers include a keyboard, video display, microprocessor, and power supply in a foldable package weighing a few pounds and dimensioned to fit within a briefcase of average size. The portability of these devices raises the issue of determining the best mode of transport, and portability also creates a storage issue, in that an apparatus so portable may have no defined resting spot for use in an office.

Operating either a computer keyboard or a laptop computer supported by the upper legs of the user may define a relaxed and casual work style, but it engenders problems nonetheless. Computer keyboards and many laptop computers are often used in conjunction with a pointer device such as a mouse or trackball, and these devices are generally supported on a desk top. Using the lap to support the keyboard or laptop computer requires sitting spaced apart from a desk, and the arm gesture required to access the more distant pointer device on the desk comprises an inconvenience. Moreover, the lap is a rather small support base for either of these devices, and can lead to instability. For example, adjusting the position of the legs, or reaching for a telephone receiver, can cause these devices to slip from the lap and fall.

Furthermore, although laptop support of a keyboard alleviates the muscle strain associated with maintaining the arms and hands raised to a desk top, the lap working position does not necessarily provide the proper support for the arms and wrists. If the user is seated in an armchair, the elbows may be braced to support the arms, but the wrists may still be vulnerable to strain from prolonged keyboard use.

SUMMARY OF THE INVENTION

The present invention generally comprises an apparatus for supporting a computer keyboard or laptop computer on the lap of the user. The apparatus is adapted to establish a stable base for the computer equipment, and to provide support for the wrists of the user. In addition, the invention includes means for supporting an input pointer device, such as a mouse or trackball, and further provides storage for computer floppy disks and the like. Furthermore, the apparatus provides a structure for storage and transport of a laptop computer.

The apparatus is generally comprised of a top member, medial member, and lower member assembled in vertically stacked relationship. The top member includes a laterally extending upper surface adapted to support a computer keyboard or laptop computer. A raised ledge extends laterally and adjacent to a proximal edge of the upper surface, at a height slightly greater than that of a keyboard supported on the upper surface. The ledge includes a pair of laterally opposed resilient pads to engage the wrists and heels of the hands of the user in supporting relationship. The medial member and the upper member are provided with similar plan profiles, and include confronting surfaces having paired channels of like configuration. The paired channels define together an interior cavity extending laterally below the upper support surface and having laterally opposed open ends. A drawer is received within the interior cavity in slidable fashion, and adapted to be withdrawn from either end of the cavity to approximately one-half its lateral extent. The drawer is formed in bilateral sections, one including means to support a mouse pad, and the other including means for storing a plurality of floppy disks or the like. In addition, a plurality of clips formed between the bilateral sections are disposed to retain a removable copy stand, which may be erected by engaging a pair of holes formed in each bilateral portion of the drawer.

The lower member includes a plan configuration similar to the upper and medial members, and is provided with a wedge form that tapers in thickness from the distal edge to the proximal edge. A pair of shallow troughs are formed in the bottom surface of the lower member, extending generally longitudinally between the proximal and distal edges thereof to accommodate the legs of the user. In addition, the bottom surface is formed of dense foam material having a plurality of convex protrusions or dimples disposed in a regular array to provide soft contact and high friction while permitting air circulation for enhanced comfort.

The proximal and distal sides of the apparatus are arcuate, having a large radius of curvature centered on the longitudinal axis of the assembly. A handle is formed integrally in the proximal surfaces of the upper and medial members and located generally symmetrically with respect to the longitudinal axis. The apparatus may further include a foot protruding from the distal side of the assembly, the protrusion having a base surface extending orthogonally to the longitudinal axis and to the upper support surface. An optional stability plate may be removably secured to the base surface, so that the stability plate may be disposed horizontally in ground-engaging fashion with the assembly extending upwardly therefrom. The apparatus may also be provided with an optional clamp assembly removably secured to the protruding foot and adapted to engage the edge of a table or desk to support the apparatus in cantilever fashion. The clamp assembly permits the apparatus to be stored, along with the computer keyboard or laptop computer supported thereof, in a manner that extends the virtual desktop storage space.

In a further aspect of the invention, a removable strap may be provided to circumscribe the assembly colinearly with the longitudinal axis thereof. The strap may pass through the handle and slots in the stability plate, and extend about a keyboard or a laptop computer supported on the upper support surface and abutting the wrist support ledge. The strap permits the transport and storage of a laptop computer while secured to the apparatus for protection and support.

BRIEF DESCRIPTION OF THE DRAWING

FIG. 1 is a plan view of the computer keyboard support apparatus of the present invention.

FIG. 2 is a distal end view of the computer keyboard support apparatus, taken generally along line 2—2 of FIG. 1.

FIG. 8 is a partial perspective view of the apparatus of the invention, shown with the drawer assembly extended and the copy stand deployed.

FIG. 9 is a plan view of a further embodiment of the invention, comprising a desk clamp assembly for securing the apparatus to the edge of a desk or table.

FIG. 10 is a partially cutaway exploded side view showing the assembly of the desk clamp to the computer keyboard support apparatus.

FIG. 11 is a plan view of a further embodiment of the invention, comprising a stability plate for supporting the computer keyboard support apparatus in ground-engaging fashion.

DESCRIPTION OF THE PREFERRED EMBODIMENT

Figure 4:
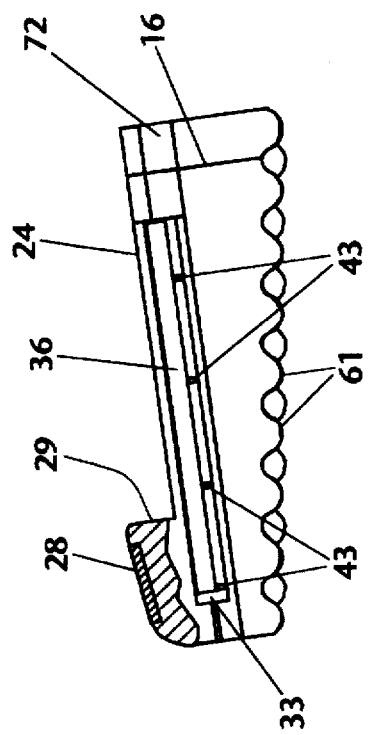
FIG. 4 is a partially cutaway side elevation of the computer keyboard support apparatus.
Figure 5:
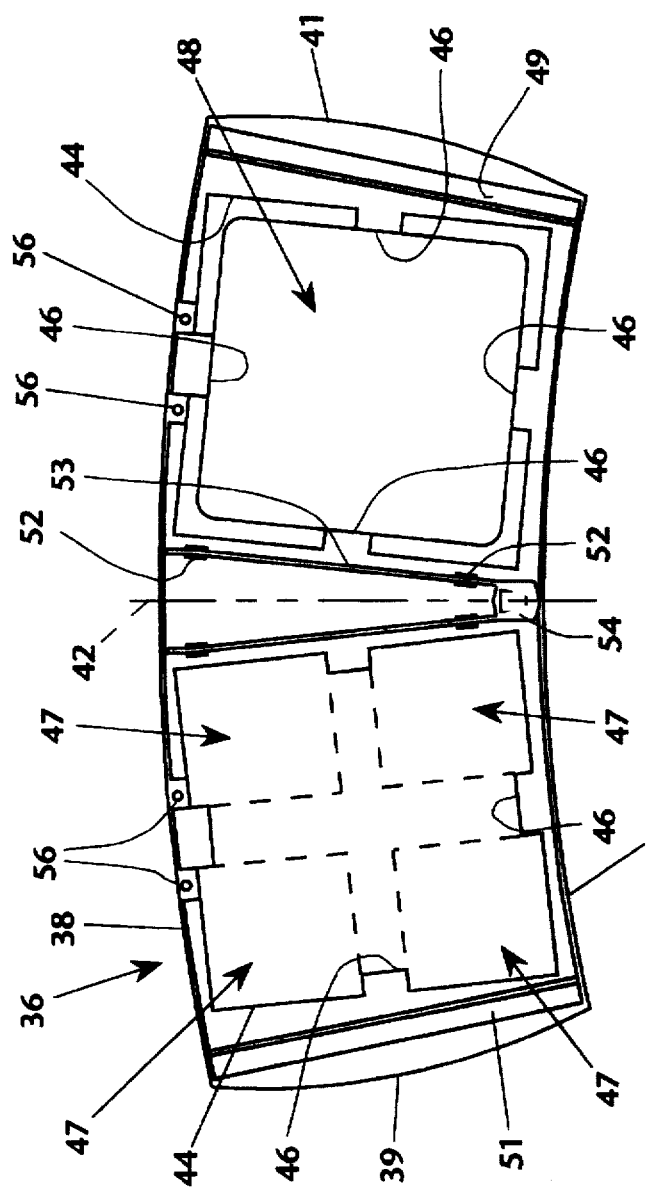
FIG. 5 is a plan view of the drawer assembly of the computer keyboard support apparatus.
Figure 3:
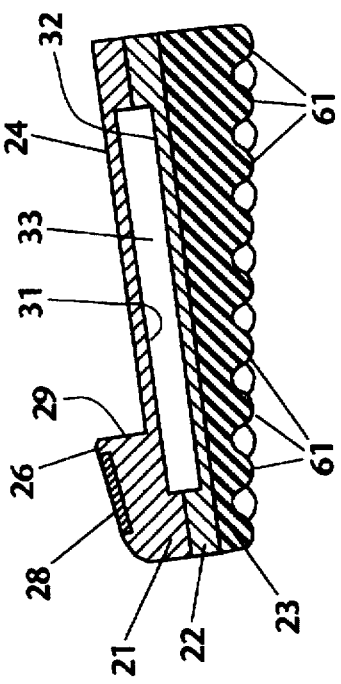
FIG. 3 is a cross-sectional side elevation of the computer keyboard support apparatus, taken along line 3—3 of FIG. 1.

The present invention generally comprises an apparatus for supporting a computer keyboard or laptop computer on the lap of the user. With regard to FIGS. 1–4, the apparatus includes proximal and distal sides 14 and 16, respectively, spaced apart along a longitudinal axis 15, and laterally opposed ends 17 and 18. The proximal and distal sides are arcuate, having a large radius of curvature centered on the longitudinal axis 15 of the assembly, and the ends 17 and 18 flare from the proximal to distal sides.

The apparatus is comprised of a top member 21, a medial member 22, and a lower member 23. The top member 21 is preferably fabricated of molded or formed plastic or resin material, and includes a planar upper surface 24 adapted to support a computer keyboard or a laptop computer. A narrow raised ledge 26 projects upwardly adjacent to the proximal side of the top member and extends substantially the entire width thereof. A pair of resilient pads 27 and 28 are inset in the top surface of the ledge 26, extending laterally and disposed in bilateral symmetry. The ledge 26 is provided as a rest and support for the wrists and the heels of the hands of a user, and the pads 27 and 28 provide a soft and comfortable surface for skin contact. The ledge 26 also defines an upwardly extending side surface 29, against which a keyboard or laptop computer may be abutted for support and stability.

The lower surface of the top member 21 is provided with a channel 31 extending laterally therethrough and having arcuate proximal and distal sides parallel to corresponding sides of the apparatus. The medial member 22 comprises a generally planar member having peripheral edges configured to correspond with the sides 14 and 16 and ends 17 and 18 of the apparatus. The member 22 includes an upper surface provided with a channel 32 disposed in paired, confronting relationship to the channel 31. The two channels 31 and 32 define together an interior cavity 33 disposed below the upper surface 24 and extending the width of the apparatus to laterally opposed openings in the sides 17 and 18.

The apparatus further includes a drawer assembly 36, shown in FIG. 4, which is dimensioned to be received in the cavity 33 in freely translating relationship. The drawer assembly 36 includes arcuate proximal and distal sides 37 and 38 extending generally parallel to the corresponding sides 14 and 16 of the apparatus and dimensioned to fit within the cavity 33, and arcuate tab ends 39 and 41. The tab ends 39 and 41 extend from opposed ends of the cavity 33 and project from the apparatus (FIG. 1) to serve as drawer handles or pulls. That is, the drawer 36 may be extended from either end of the apparatus to approximately one-half of its lateral extent. A plurality of ribs 43 project from the bottom surface of the drawer assembly and extend laterally to impinge on the channel 32 and serve as drawer glides.

The drawer assembly 36 is configured in bilateral symmetry about a longitudinal axis 42, and is provided with features that enhance the use of the computer keyboard or laptop computer supported on the apparatus. Each side of the drawer assembly is provided with a shallow planar recess 44 that is generally square. A quartet of tabular projections 46 are also provided, each extending inwardly from a medial portion of one side of recess 44. The projections define a quartet of corner receptacles which are dimensioned to receive and secure four data storage disks, such as the ubiquitous 3.5 inch (90 mm) floppy disks or the like. Moreover, the projections 46 also define therebetween a rectangular planar open space 48 which is adapted to receive a resilient pad, such as a "mouse pad" commonly used to operate a mouse pointer device for computer input purposes.

The invention also provides a copy holder 53 for supporting a document for reference or copying purposes. The copy holder 53 includes a pair of leg struts extending from a common vertex 54 at an acute angle. A spring clip is formed at the vertex 54 and adapted to releasably retain a sheet of paper or the like. Each side of the drawer assembly is provided with a pair of holes 56 spaced apart and dimensioned to retain the distal ends of the copy stand legs, whereby the copy stand may be deployed and erected either side of the drawer assembly when extended from the apparatus. A plurality of channel brackets 52 are disposed laterally inwardly of the recesses 44, and are arrayed to releasably secure the legs of the copy holder 53 to store the copy holder when not in use.

The drawer assembly 36 further includes a pair of shallow channels 49 and 51 disposed laterally outwardly of the recesses 44, which may be used to store pens, pencils, and the like.

The lower member 23 is provided with a plan configuration similar to the upper and medial members. The lower member is preferably formed of a resilient foam material, and the bottom surface is provided with an array of convex projections 61 extending downwardly therefrom to contact the lap of the user. The top and bottom surfaces of the member 23 diverge to define a wedge form that tapers from the distal edge to the proximal edge. Thus, when the bottom surface is supported generally horizontally on the lap of the user, the upper support surface 24 is tilted slightly toward the user (FIGS. 3 and 4) to urge the keyboard supported thereon to impinge as well on the surface 29.

The bottom surface is further provided with a pair of shallow troughs 62 extending generally parallel to the axis 15 and spaced apart therefrom in lateral opposition. The troughs 62 engage the legs 63 of the user for lateral stability, while the projections 61 provide high surface friction, soft contact with the user, and air circulation through the contacting surfaces.

A further feature of the apparatus is the provision of a handle 66 disposed in a medial portion of the side 14 of the apparatus. The handle 66 14 is defined by a cutout 67 extending through the members 21 and 22, and a corresponding relief cutout formed in the lower member 23. The handle 66 facilitates easy transport of the apparatus.

Figure 6:
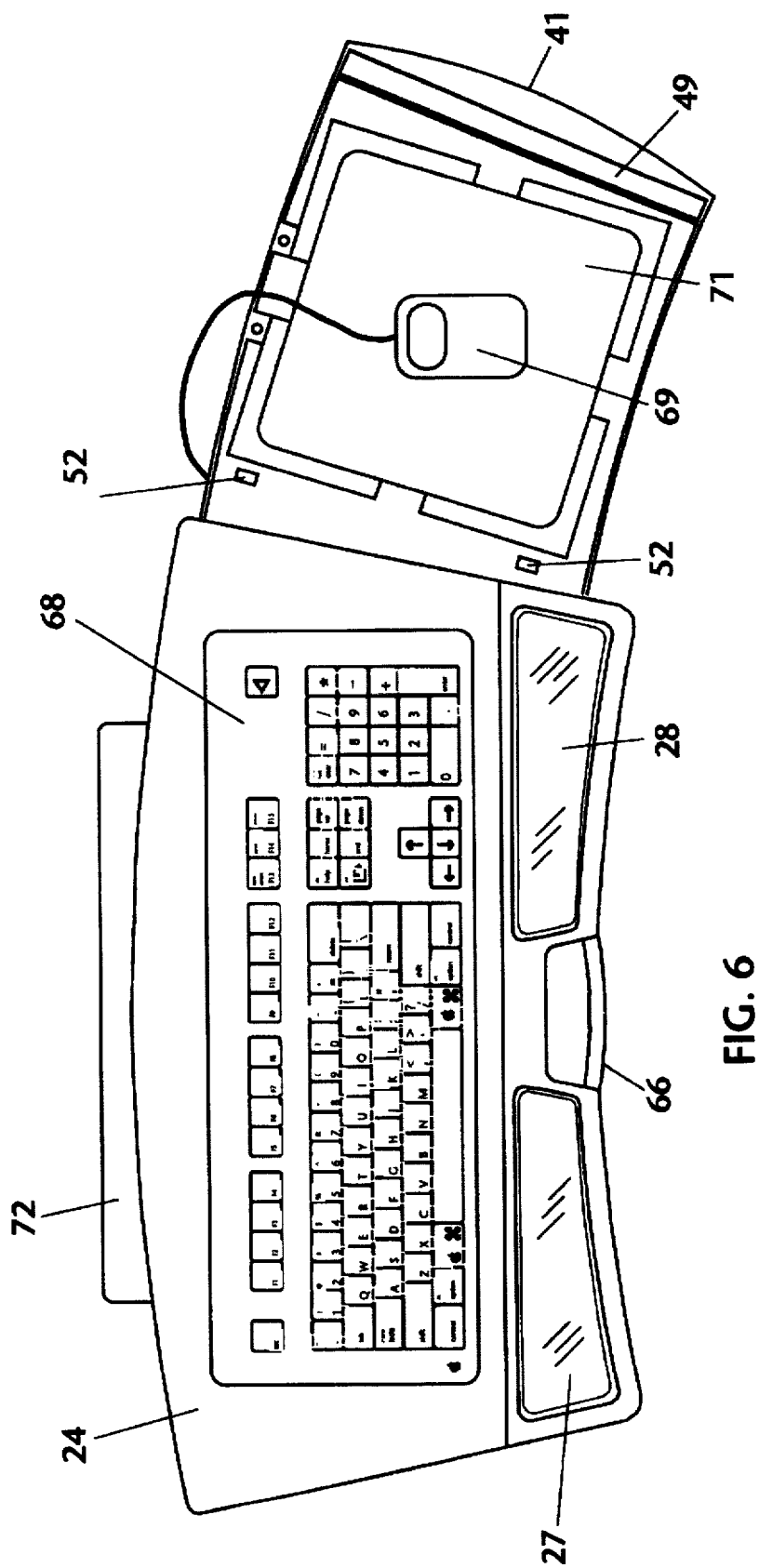
FIG. 6 is a top plan view of the apparatus of the invention, shown in use supporting a computer keyboard, with the drawer assembly extended to support a mouse input device.
Figure 7:
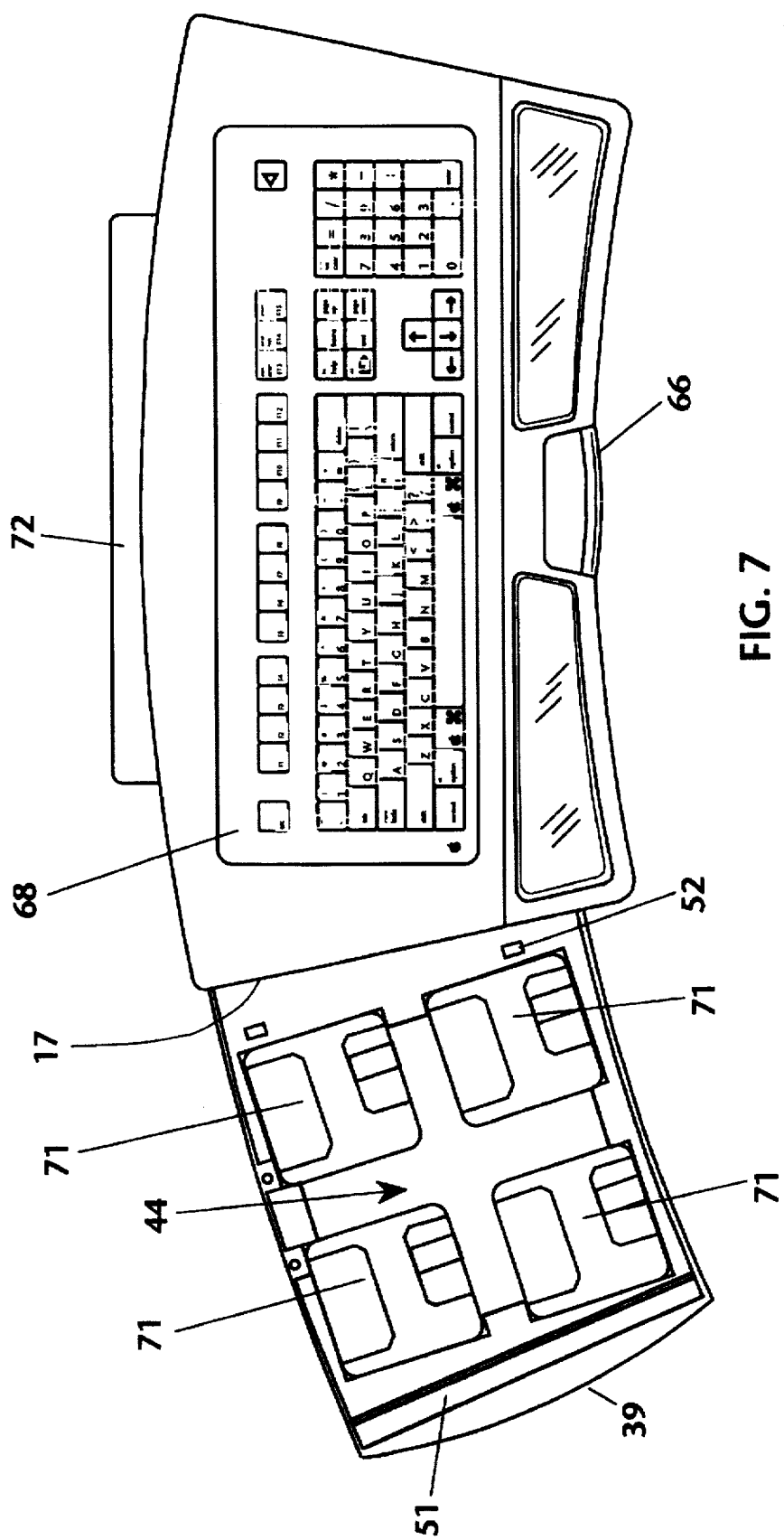
FIG. 7 is a top plan view of the apparatus of the invention, shown in use supporting a computer keyboard, with the drawer assembly extended to access floppy disk storage.

With regard to FIG. 6, a keyboard 68 may be supported on the upper surface 24 of the apparatus, and the apparatus is in turn supported on the upper legs of a seated computer user. The drawer 36 may be extended from the end 18, and a mouse pointer device 69 may be operated on a pad 71 supported on the half of the drawer available for use. The wrist pads 27 and 28 provide support for the hands and arms of the user to alleviate strain from prolonged computer use, and the mouse 69 is available in a short, convenient reach from the keyboard 68. Likewise, as shown in FIG. 7, the drawer may be extended from the end 17 to gain access to a plurality of data disks 70 stored in the recess 44 of the opposite side portion of the drawer. Furthermore, as depicted in FIG. 8, the copy holder 53 may be deployed in the mounting holes 56 of either side portion of the drawer to display a document for visual reference purposes for the computer user.

The apparatus of the invention may further be furnished with a foot 72 extending distally from the distal edge 16 and centered symmetrically with respect to the longitudinal axis 15. The foot 72 comprises aligned projections extending from the members 21, 22, and 23, and is provided primarily to define a planar surface 73 disposed generally perpendicularly to the axis 15 and to the support surface 24. With reference to FIGS. 9 and 10, a desk clamp 74 comprises a laterally extending web 75 and a pair of flanges 76 and 77 extending therefrom in parallel relationship. The web 75 is dimensioned in correspondence to the surface 73 of the foot 72, and may be removably secured in abutment thereto by a plurality of thumb screws 78. The spacing of the flanges 76 and 77 defines a slot therebetween which is dimensioned to accept an edge portion of a desk top or a table top. Thus, the clamp 74 facilitates supporting the apparatus of the invention on the edge of a desk or table in cantilever fashion.

An additional feature of the feature is the provision of a stability plate 81, shown in FIG. 11. The stability plate 81 comprises a panel of rigid material that is substantially similar in width to the foot surface 73, and substantially greater in depth. The stability plate may be removably secured to the foot surface 73 in place of the desk clamp 74 by the plurality of thumb screws 78 extending through the holes 82. The plate 81 is adapted to be a ground-engaging support, whereby the apparatus may be placed on a horizontal surface with the plate 81 in flush relationship therewith and the surface 24 extending upwardly therefrom.

Figure 12:
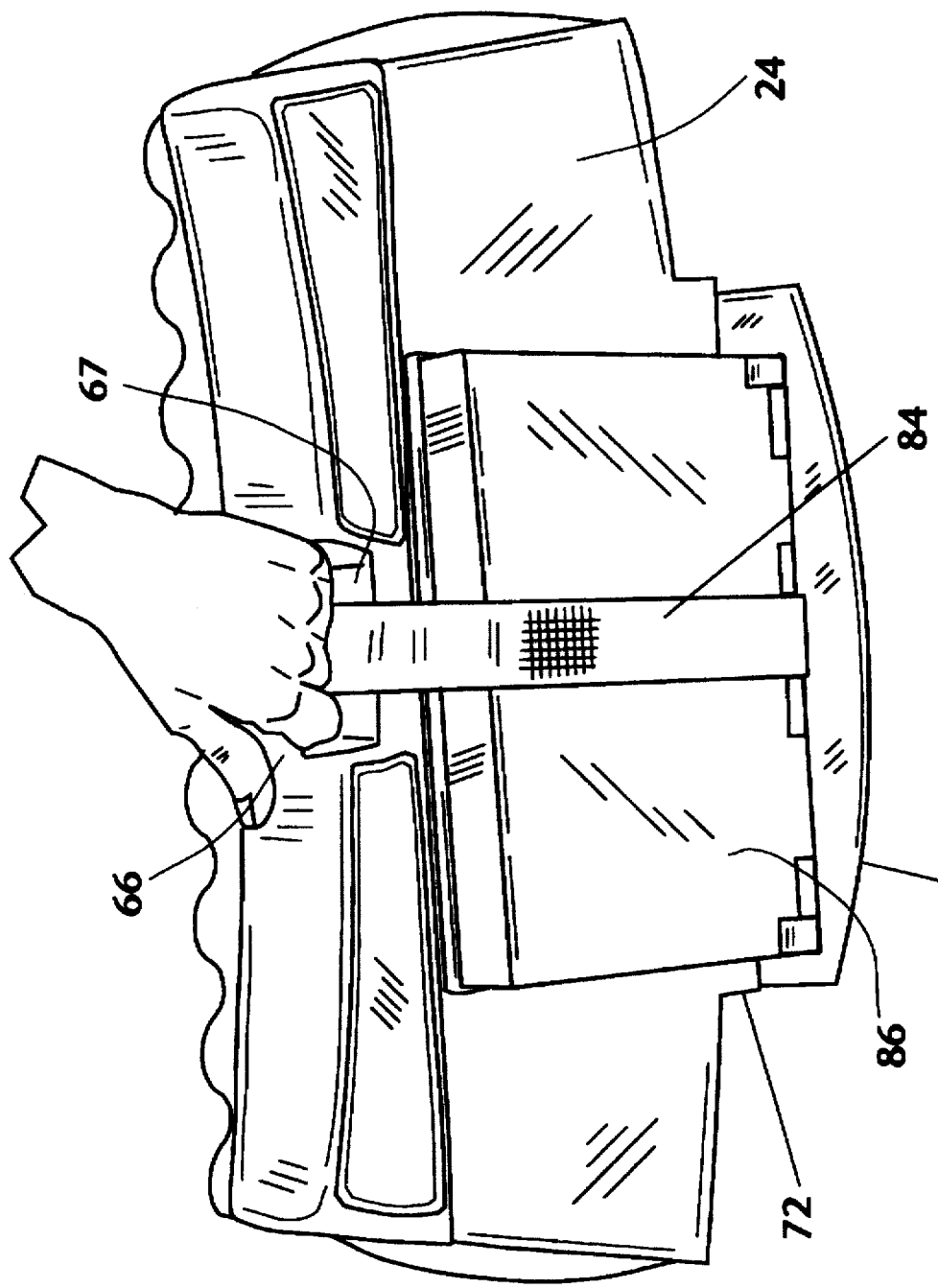
FIG. 12 is a perspective view depicting the computer keyboard support apparatus in transport, with the stability plate assembled thereto and a laptop computer secured to the apparatus.

In addition, a pair of slots 83 are formed in a medial portion of the plate 81. A strap 84 may be passed through the slots 83, through the handle cutout 67, and secured about the entire apparatus. As shown in FIG. 12, a laptop computer 86 may be supported on the stability plate 81 in abutting relationship to the surface 24, and the strap 84 may be passed about the computer 86 to secure the computer 86 to the apparatus for transport purposes. The assembled devices may be carried using the handle 66, as shown, and may be placed at rest on a floor or horizontal surface using the stability plate both to retain the computer 86 and to support the assembly on the horizontal surface.

Thus the apparatus provides a more secure and stable platform for supporting a computer keyboard or laptop computer with greater comfort and freedom of use. It facilitates the use of a mouse pointer device, and supports a document for reference purposes, and also stores a plurality of data storage disks. These multiple functions are provided by a compact, lightweight device that is designed to be portable and storable in a small space.

It may be appreciated that the various aspects of the invention are substantially independent features, and may be provided or eliminated without departing from the scope and spirit of the invention. For example, some or all of the enumerated features, including the drawer assembly 36, the storage features and mouse pad of the drawer assembly, the copy holder 53, desk clamp 74, stability plate 81, and strap 84 may be provided as befits the needs and desires of the intended user.

What is claimed is:

1. A computer support device, comprising:

rigid upper surface means for supporting a computer keyboard;

bottom surface means for engaging upper leg portions of a seated individual using said computer keyboard;

drawer means disposed beneath said upper surface means for storing computer-related supplies;

said drawer means including an interior cavity disposed beneath said upper surface means and including laterally opposed open ends;

said drawer means further including a drawer dimensioned to be received in said interior cavity in slidable fashion, said drawer adapted to be slidably withdrawn from either of said laterally opposed open ends.

2. The computer support device of claim 1, wherein said drawer means includes means for storing and deploying a surface for operating a mouse pointer device operatively associated with said computer keyboard.

3. The computer support device of claim 2, further including copy holder means for supporting and displaying a document adjacent to said upper surface means.

4. The computer support device of claim 3, wherein said copy holder means is movable from a first position in which said copy holder means is stored in said drawer means to a second position in which said copy holder means is erected on said drawer means and disposed to support and display a document.

5. The computer support device of claim 1, wherein said drawer includes one portion adapted to support a mouse pad for operating a mouse pointer device.

6. The computer support device of claim 5, wherein said drawer includes another portion adapted to store at least one data storage disk.

7. The computer support device of claim 6, further including copy holder means for supporting a document for reference adjacent to said top surface.

8. The computer support device of claim 7, further including means for supporting said copy holder means on said drawer.

9. The computer support device of claim 8, wherein said means for supporting said copy holder means includes two mounting hole means formed in said one portion and said another portion of said drawer.

10. The computer support device of claim 9, further including means for storing said copy holder means in said drawer.

11. The computer support device of claim 10, wherein said means for storing said copy holder means includes at least one detent clip disposed between said one portion and said another portion of said drawer.

12. The computer support device of claim 5, wherein said one portion and said another portion of said drawer are formed in bilaterally symmetrical, enantiomorphic relationship.

13. The computer support device of claim 1, wherein said drawer includes proximal and distal edges disposed in parallel relationship, said proximal and distal edges extending in arcuate conformation.

14. The computer support device of claim 13, further including a handle formed in said device adjacent to said proximal edge.

15. A computer support device, comprising:

a device body having rigid upper surface means to support a computer keyboard;

said device body including bottom surface means for engaging upper leg portions of a seated individual using said computer keyboard;

a computer mouse-operating surface;

means for supporting and selectively moving said computer mouse-operating surface from a deployed position in which said computer mouse-operating surface is disposed adjacent and generally parallel to said rigid upper surface, to a storage position in which said computer mouse-operating surface is stored within said device body, without removing a computer keyboard supported on said upper surface means.

16. The computer support device of claim 15, wherein said device body includes an interior cavity disposed beneath said upper surface means, said interior cavity including laterally opposed open ends, said means for supporting and selectively moving said computer mouse-operating surface being received in said interior cavity in slidable fashion and adapted to be slidably withdrawn from one of said laterally opposed open ends.

17. A computer support device, comprising:

upper surface means for supporting a computer keyboard;

bottom surface means for engaging upper leg portions of a seated individual using said computer keyboard;

wrist support means extending adjacent to said upper surface means for supporting the hands of the user when operating said keyboard; and, foot means having base surface means extending generally orthogonally to said upper surface means, said base surface means adapted to support said device in ground-engaging fashion; and, stability plate means for supporting said device in ground-engaging fashion, and means for removably securing said stability plate means to said base surface means.

18. A computer support device, comprising:

upper surface means for supporting a computer keyboard;

bottom surface means for engaging upper leg portions of a seated individual using said computer keyboard;

wrist support means extending adjacent to said upper surface means for supporting the hands of the user when operating said keyboard; and, foot means having base surface means extending generally orthogonally to said upper surface means, said base surface means adapted to support said device in ground-engaging fashion; and, clamp means for securing said device to an outer edge of a table, and means for removably securing said clamp means to said base surface means.

* * * * *